US006248801B1

(12) United States Patent
Meier

(10) Patent No.: US 6,248,801 B1
(45) Date of Patent: Jun. 19, 2001

(54) TERTIARY AMINE-CONTAINING ACTIVE METHYLENE COMPOUNDS FOR IMPROVING THE DIMENSIONAL STABILITY OF POLYURETHANE FOAM

(75) Inventor: Ingrid Kristine Meier, Asbury, NJ (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/439,138

(22) Filed: Nov. 12, 1999

(51) Int. Cl.[7] .................................................. C08J 9/04
(52) U.S. Cl. ........................ 521/128; 521/129; 521/155; 521/163; 521/164
(58) Field of Search .................................. 521/128, 129, 521/155, 163, 164

(56) References Cited

U.S. PATENT DOCUMENTS

| 4,022,720 | 5/1977 | Blahak et al. . | |
|---|---|---|---|
| 4,211,849 | 7/1980 | Kollmeier et al. | 521/164 |
| 4,751,253 | 6/1988 | Tylenda | 521/114 |
| 4,929,646 | 5/1990 | Nichols et al. | 521/137 |
| 5,039,713 | 8/1991 | Petrella | 521/129 |
| 5,192,812 | 3/1993 | Farris et al. | 521/112 |
| 5,489,618 | 2/1996 | Gerkin | 521/128 |
| 5,807,958 | 9/1998 | Diblitz et al. | 528/571 |
| 5,824,711 | * 10/1998 | Kimock et al. | 521/129 |

FOREIGN PATENT DOCUMENTS

| 3134592 | 9/1981 | (DE) . |
| 0471260 | 8/1991 | (EP) . |

* cited by examiner

Primary Examiner—John M. Cooney, Jr.
(74) Attorney, Agent, or Firm—Mary E. Bongiorno

(57) ABSTRACT

A method for making flexible polyurethane foam in which a polyisocyanate is reacted with a polyol in the presence of a urethane catalyst, a blowing agent, optionally a silicone surfactant cell stabilizer, and a cell opening additive. The cell opening additive comprises an active methylene or methine compound which also contains a tertiary amine. Preferred cell opening additives are 2-cyano-N-[3-(dimethylamino)-propyl]acetamide and $(NC)CH_2C(O)OCH_2CH_2N(CH_3)CH_2CH_2OCH_2CH_2N(CH_3)_2$.

13 Claims, No Drawings

TERTIARY AMINE-CONTAINING ACTIVE METHYLENE COMPOUNDS FOR IMPROVING THE DIMENSIONAL STABILITY OF POLYURETHANE FOAM

BACKGROUND OF THE INVENTION

Flexible molded polyurethane foam requires mechanical crushing to open the foam cells and prevent shrinkage. Prevention of shrinkage results in improved dimensional stability. Current mechanical methods for cell opening consist mainly of crushing, vacuum rupture or time pressure release. However, these methods usually result in incomplete or inconsistent cell opening and require the foam producer to invest in additional labor and machinery. A chemical method for cell opening which can be incorporated into the foam production process is therefore preferred.

Current chemical methods for cell opening have drawbacks such as requiring high amounts of additive (often as high as 1–5 parts per hundred parts polyol) or adversely affecting the physical properties of the foam. Some examples of current chemical methods for cell opening of polyurethane foam are described below:

U.S. Pat. No. 4,211,849 (Kollmeier et al., 1980) discloses a process for producing an open-celled polyurethane foam by mixing a polyol with a polyisocyanate, a catalyst, a blowing agent, and a crystalline polyhydroxy crosslinker, such as sorbite, mannite, trimethylolmelamine, and glucose, having at least 3 hydroxy groups.

U.S. Pat. No. 4,751,253 (Tylenda, 1988) discloses the use of an additive comprising an ester reaction product of a long chain acid with polyethylene or polypropylene glycols and/or containing free acid to produce an open celled, dimensionally stable, flexible urethane foam product.

U.S. Pat. No. 4,929,646 (Nichols et al., 1990) discloses high molecular weight, high functionality poly(oxyethylene) compounds as cell openers and softeners. The compounds are reported to be highly effective in opening the cells of foam based on PIPA polyols and in softening foams made from MDI-based polyisocyanates.

U.S. Pat. No. 5,039,713 (Petrella, 1991) and U.S. Pat. No. 5,057,480 (Petrella, 1991) disclose blowing reaction catalysts for the production of polyurethane foams. The tertiary amine catalysts consisting essentially of 25 to 80 wt % pentamethyldiethylenetriamine and 20 to 75 wt % bis (dimethylaminopropyl)methylamine are reported to provide cell opening of the foam resulting in improved breathability.

EP 471,260 (1992) discloses a process for the production of open-cell, flexible polyurethane foam in which organic acids, such as benzoic, salicylic, or adipic, or an alkali metal salt of the acid is used as an additive.

U.S. Pat. No. 5,192,812 (Farris et al., 1993) discloses the use of siloxane-oxyalkylene copolymers as cell openers in the production of urethane foams, when employed in combination with silicone surfactants.

U.S. Pat. No. 5,489,618 (Gerkin, 1996) discloses the use of an amine salt, formed by the reaction between a tertiary amine and a carboxylic acid having hydroxyl functional groups, for producing polyurethane foams. The amine salt reportedly produces foams which either are more open or more easily opened, or both, and have a reduced tendency to shrink.

U.S. Pat. No. 5,807,958 (Diblitz et al., 1998) discloses alkaline metal and alkaline earth metal salts of alkyl and alkenyl succinic acids as catalyst for making polyurethane foam. The catalysts are reported to have a favorable influence on the cell structure of the foam.

BRIEF SUMMARY OF THE INVENTION

This invention is directed to a method for making polyurethane foam in which an active methylene or methine compound containing a tertiary amine is used as a cell opening additive. The following advantages are achieved using the cell opening additives of this invention:

- the additive is highly effective for polyurethane foam systems based on toluene diisocyanate;
- the force to crush values of the foams are dramatically reduced;
- the dimensional stability of the foam is improved, thus reducing shrinkage;
- the physical properties of the foam are not adversely effected by the additive;
- relatively low levels of the additive (0.001 to 2.5 pphp) are needed to create cell opening; and
- the additive can also act as a catalyst, due to the presence of a tertiary amine moiety.

For purposes of this invention and as is understood by many in the art, flexible molded foams can include microcellular foams such as those used in shoe soles and steering wheels, as well as the flexible molded foams used in a variety of applications such as furniture, bedding and automotive seating.

DETAILED DESCRIPTION OF THE INVENTION

The cell opening additive contains both an active methylene or methine group and a tertiary amine group. Active methylene and methine compounds are carbon acids containing electron-withdrawing groups. The electron-withdrawing groups act to increase the acidity of neighboring carbon-hydrogen bonds by stabilizing the conjugate base that is formed upon deprotonation (T. H. Lowry and K. S. Richardson, *Mechanism and Theory in Organic Chemistry*, 2nd Ed., 1981, pp. 262–281). Typical electron-withdrawing groups are —CN, RC(O)—, RSO$_2$—, ROC(O)—, where R is any alkyl or aryl group. Conversely, the presence of an electron-donating group, such as an alkyl group, can decrease the acidity of neighboring carbon-hydrogen bonds.

The relative acidity of these types of compounds can be determined by a number of methods. One common method is to measure the equilibrium constant for dissociation, $K_a$, of the compounds. Tables of pKa values for a variety of Bronsted acids are readily available (for example in J. A. Dean, *Lange's Handbook of Chemistry*, 14th Ed., 1992, pp. 8.19–8.71). However, solvent plays a large part in determining acidity in solution; therefore, one must be careful to compare pKa values that have been obtained using dilute solutions of the compounds in the same solvent at the same temperature. Alternatively, gas-phase acidity ($\Delta Hi$) of the compounds can be measured or calculated in order to obtain relative acidity of these types of compounds.

Because of the strong role that solvent plays in determining the acidity of compounds in solution, certain active methylene and methine compounds will perform better as cell openers if they are dissolved in water than if they are delivered as a neat liquid or as solutions in less polar solvents. Many of the compounds that are effective for improving the dimensional stability (reducing shrinkage) of polyurethane foam have pKa values that are less than about 10.8 (measured in water at 25° C.). However, the pKa values of active methylene and methine compounds that are less water soluble may be misleading. Because of this, the compounds of this invention are not limited by having a pKa value within a specified range.

Examples of cell opening additives of this invention are tertiary amine-containing esters, amides, and thioesters of cyanoacetic acid, 1,3-acetone dicarboxylic acid, and substituted-acetic acids in which the substituents are electron-withdrawing groups. Following are several classes of compounds of this invention.

One class of compounds is esters of cyanoacetic acid having the general formula

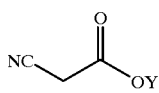

in which Y is a substituted C6–C10 aryl or CXX'X" wherein X, X', and X" are, independently, hydrogen, halogen, substituted or unsubstituted C1–C20 alkyl, C1–C20 alkylether, C1–C20 alkylamino, substituted or unsubstituted C6–C10 aryl, and at least one of the substituents on Y contains a tertiary amine group. Examples of specific compounds within this group are shown below:

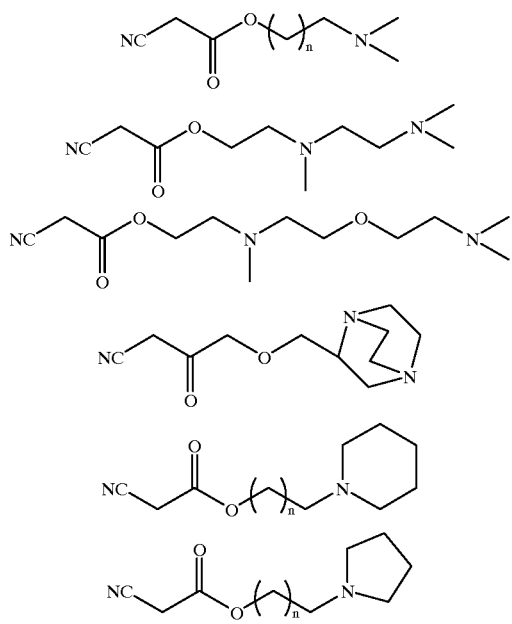

in which n is 1 or 2.

Another class of compounds is amides of cyanoacetic acid having the general formula:

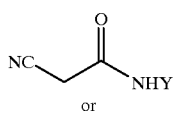

or

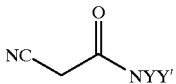

in which Y and Y' are, independently, a substituted C6–C10 aryl or CXX'X" wherein X, X', and X" are, independently, hydrogen, halogen, substituted or unsubstituted C1–C20 alkyl, C1–C20 alkylether, C1–C20 alkylamino, substituted or unsubstituted C6–C10 aryl, and at least one of the substituents on Y or Y' contains a tertiary amine group.

Examples of specific compounds within this group are shown below:

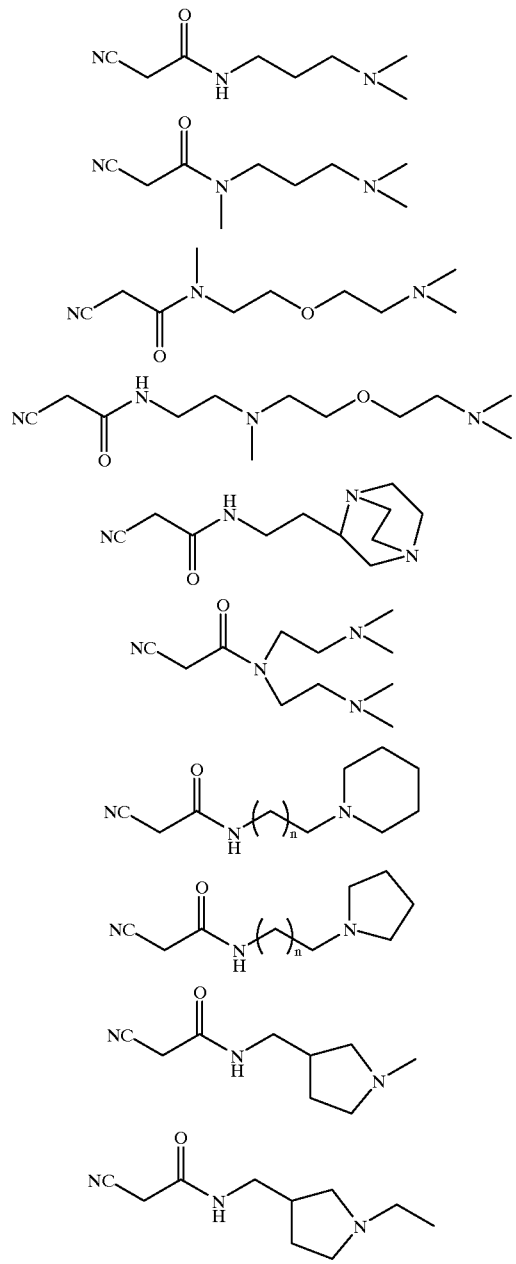

in which n=1 or 2.

Another class of compounds is thioesters of cyanoacetic acid having the general formula:

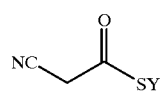

in which Y is a substituted C6–C10 aryl or CXX'X" wherein X, X', and X" are, independently, hydrogen, halogen, substituted or unsubstituted C1–C20 alkyl, C1–C20 alkylether, C1–C20 alkylamino, substituted or unsubstituted C6–C10 aryl, and at least one of the substituents on Y contains a tertiary amine group. Examples of specific compounds within this group are:

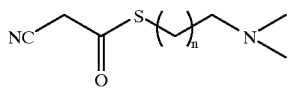

in which n=integers from 1 to 4.

Another group of compounds is esters of ketocarboxylic acids having the general formula:

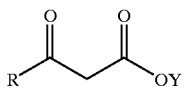

in which R is a substituted or unsubstituted C1–C20 alkyl or a substituted or unsubstituted C6–C10 aryl, and Y is a substituted or unsubstituted C6–C10 aryl or CXX'X" wherein X, X', and X" are, independently, hydrogen, halogen, substituted or unsubstituted C1–C20 alkyl, C1–C20 alkylether, C1–C20 alkylamino, substituted or unsubstituted C6–C10 aryl, and at least one of the substituents on Y contains a tertiary amine group. Examples of specific compounds within this group are:

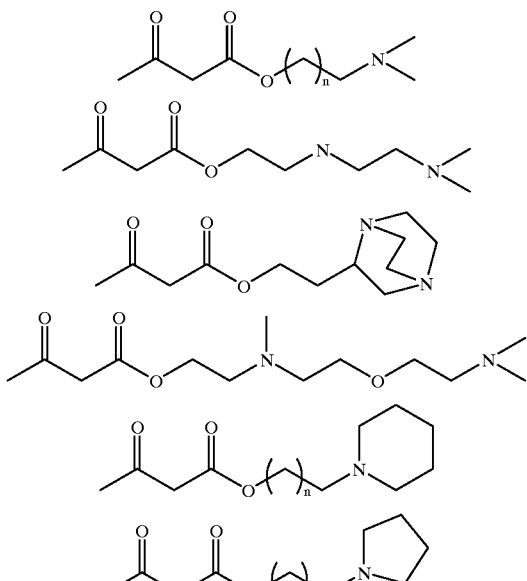

in which n is 1 or 2.

Another group of compounds is amides of ketocarboxylic acids having the general formula:

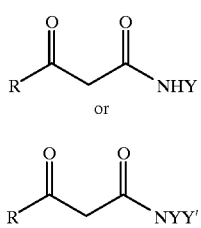

in which R is a substituted or unsubstituted C1–C20 alkyl or a substituted or unsubstituted C6–C10 aryl, and Y and Y' are, independently, a substituted C6–C10 aryl or CXX'X" wherein X, X', and X" are, independently, hydrogen, halogen, substituted or unsubstituted C1–C20 alkyl, C1–C20 alkylether, C1–C20 alkylamino, substituted or unsubstituted C6–C10 aryl, and at least one of the substituents on Y or Y' contains a tertiary amine group. Examples of specific compounds within this group are shown below:

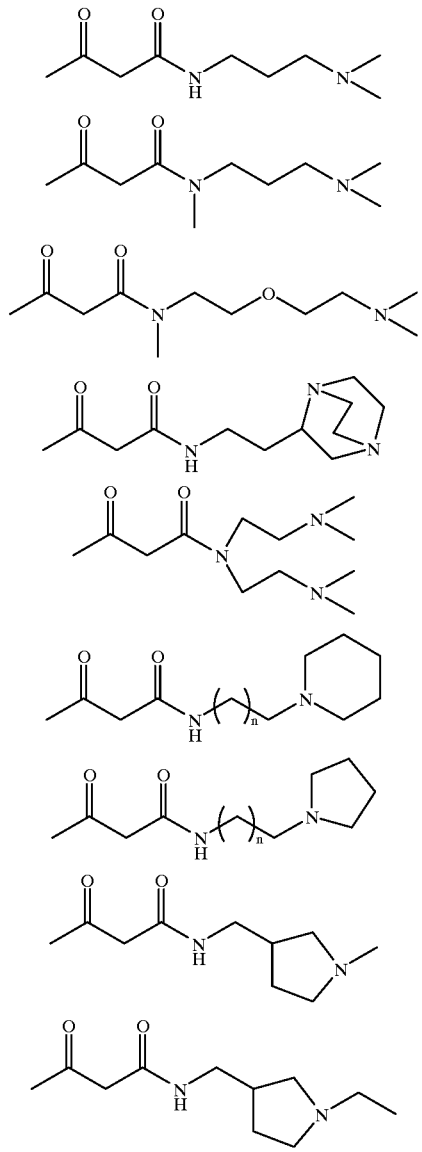

in which n is 1 or 2.

Another group of compounds is thioesters of ketocarboxylic acids having the general formula

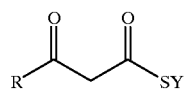

in which R is a substituted or unsubstituted C1–C20 alkyl or a substituted or unsubstituted C6–C10 aryl, and Y is a substituted C6–C10 aryl or CXX'X" wherein X, X', and X" are, independently, hydrogen,.halogen, substituted or unsubstituted C1–C20 alkyl, C1–C20 alkylether, C1–C20 alkylamino, substituted or unsubstituted C6–C10 aryl, and at least one of the substituents on Y contains a tertiary amine group. Examples of specific compounds within this group are shown below:

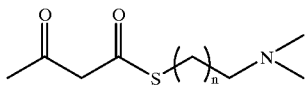

in which n=integers from 1 to 4.

Another group of compounds is esters of 1,3-acetone dicarboxylic acid having the general formula

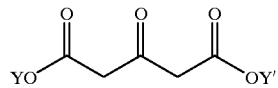

in which Y and Y' are, independently, a substituted C6–C10 aryl or CXX'X" wherein X, X', and X" are, independently, hydrogen, halogen, substituted or unsubstituted C1–C20 alkyl, alkylether, alkylamino, substituted or unsubstituted C6–C10 aryl, and at least one of the substituents on Y or Y' contains a tertiary amine group. Examples of specific compounds within this group are shown below:

in which n=1 or 2.

Another group of compounds is amides of 1,3-acetone dicarboxylic acid having the general formula:

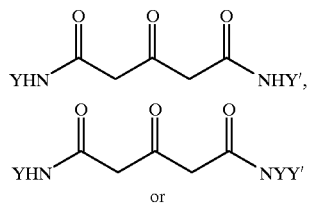

-continued in which Y, Y', Y", and Y'" are, independently, a substituted C6–C10 aryl or CXX'X" wherein X, X', and X" are, independently, hydrogen, halogen, substituted or unsubstituted C1–C20 alkyl, C1–C20 alkylether, C1–C20 alkylamino, substituted or unsubstituted C6–C10 aryl, and at least one of the substituents on Y, Y', Y", or Y'" contains a tertiary amine group. Examples of specific compounds within this group shown below:

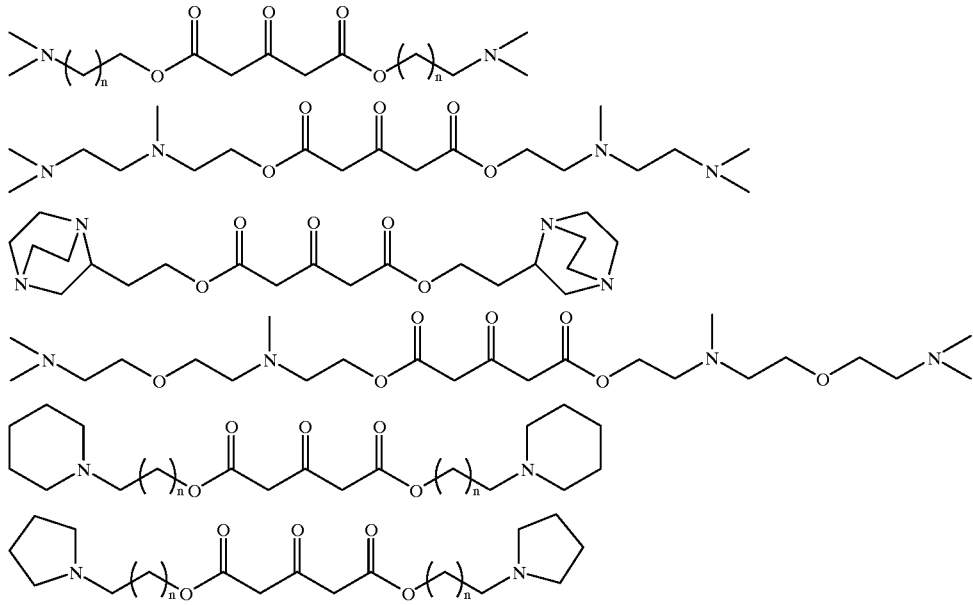

-continued

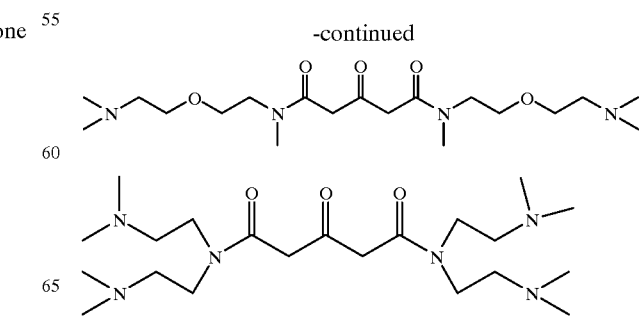

-continued

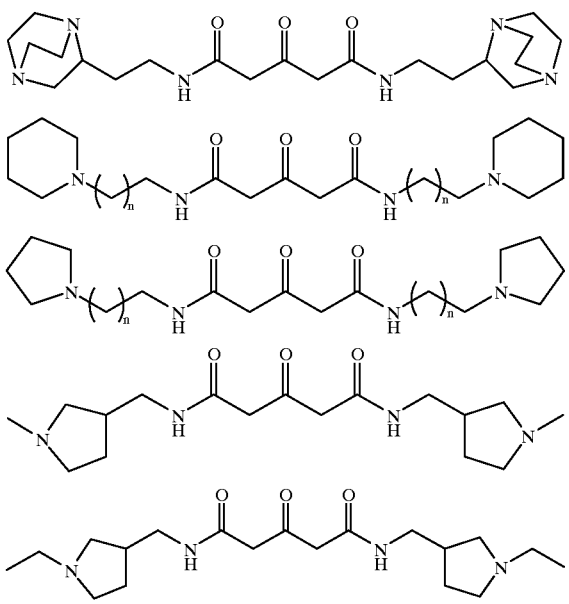

in which n is 1 or 2.

Another group of compounds is thioesters of 1,3-acetone dicarboxylic acid having the general formula:

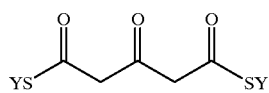

in which Y and Y' are, independently, a substituted C6–C10 aryl or CXX'X" wherein X, X', and X" are, independently, hydrogen, halogen, substituted or unsubstituted C1–C20 alkyl, C1–C20 alkylether, C1–C20 alkylamino, substituted or unsubstituted C6–C10 aryl, and at least one of the substituents on Y or Y' contains a tertiary amine group. Examples of specific compounds within this group are in which n is an integer from 1 to 4.

Compounds derived from 1,3-acetone dicarboxylic acid that contain one amide group and one ester group, one amide group and one thioester group, or one ester group and one thioester group as described above also fit within this invention.

Another group of compounds is esters of substituted-acetic acids in which the substituents are electron-withdrawing groups. The compounds have the general formula:

or in which Y is a substituted C6–C10 aryl or CXX'X" wherein X, X', and X" are, independently, hydrogen, halogen, substituted or unsubstituted C1–C20 alkyl, C1–C20 alkylether, C1–C20 alkylamino, substituted or unsubstituted C6–C10 aryl, and at least one of the substituents on Y contains a tertiary amine group, and D and D' are, independently, electron-withdrawing substituents such as $NO_2$, CN, F, Cl, Br, $CF_3$, I, C(O)OR, C(O)R, CHO, and $C(O)NH_2$. Examples of specific compounds within this group are shown below:

in which R is $NO_2$, $CF_3$, or Cl and n is 1 or 2.

Another group of compounds is amides of substituted acetic acid, in which the substituents are electron-withdrawing groups, having the general formula:

or wherein Y and Y' are, independently, substituted or unsubstituted C1–C20 alkyl, C1–C20 alkylether, C1–C20 alkylamino, substituted or unsubstituted C6–C10 aryl, and at least one of the substituents on Y or Y' contains a tertiary amine group, and D and D' are, independently, electron-withdrawing substituents such as $NO_2$, CN, F, Cl, Br, $CF_3$, I, C(O)OR, C(O)R, CHO, and $C(O)NH_2$, preferably CN.

In the above formulae, the C1 to C20 alkyl may be linear or branched; for example, methyl, ethyl, n-propyl, isopropyl, n-butyl, sec-butyl, tert-butyl, pentyl, hexyl, octyl, 2-ethylhexyl, n-decyl, cetyl, stearyl, and the like, especially C1 to C10 alkyl groups. They may be substituted with aryl, heterocyclic, halide, hydroxy, amino, alkoxy, phenoxy, nitro, keto, cyano alkylamino, thio, carboxylate, and the like.

In the above formulae, C6 to C10 aryl may be phenyl or naphthyl, optionally substituted with alkyl, aryl, halide, hydroxy, amino, alkoxy, phenoxy, nitro, keto, cyano alkylamino, thio, carboxylate, and the like.

Preferred Y groups for the above formulae are those derived from aminoalkylamines, alcoholamines, and thiolamines, such as those having the following formulae:

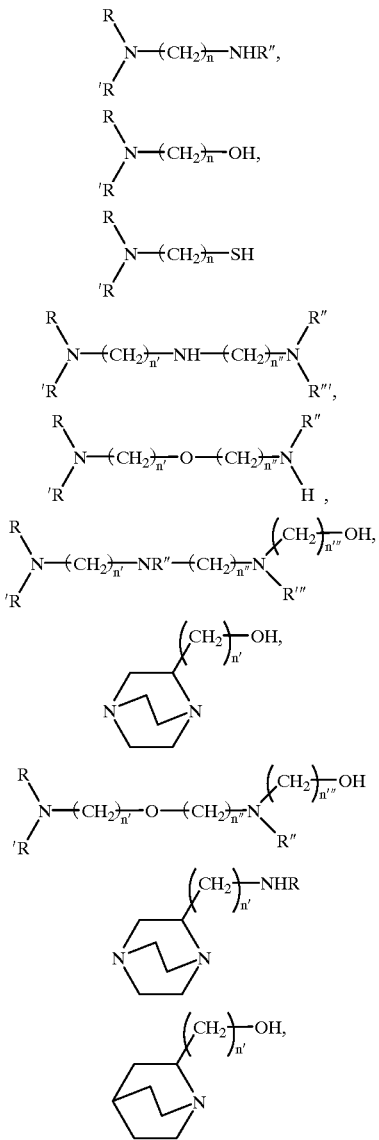

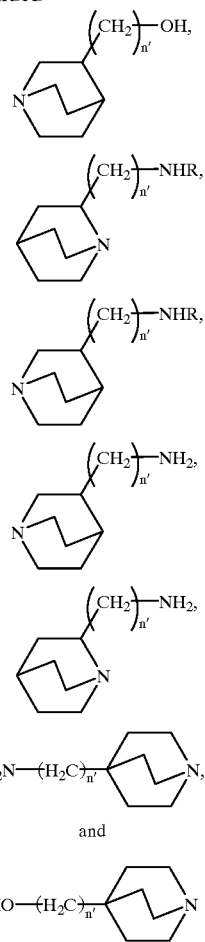

and

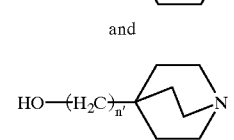

in which R and R' are, independently, C1–C4 alkyl, n, n', n", and n''' are integers of 1 to 20, and R" and R''' are, independently, hydrogen, an alkyl, an alkylether, an alkylamine, or an alkylthioether, in which alkyl is C1–C20.

Examples of preferred Y groups are those derived from 3-(dimethylamino)-propylamine, 3-dimethylamino-1-propanol, dimethylaminoethanol, trialkanolamines such as triethanolamine and tris(2-hydroxypropyl)amine, triaminoalkylamines, 1-hydroxyalkylpyrrolidines, 1-aminoalkylpyrrolidines, 1-hydroxyalkylimidazole, 1-aminoalkylimidazole, bis(aminoethyl)ether derivatives such as 2-[N-(dimethylaminoethoxyethyl)-N-methyl-amino]ethanol and 2-[N-dimethylaminoethoxyethyl)N-methylamino]-1-methylethanol, tetramethyldiethylenetriamine, $(CH_3)_2NCH_2CH_2N(CH_3)CH_2CH_2OH$, $[(CH_3)_2NCH_2CH_2CH_2]_2N(CH_2CH_2OH)$, $[(CH_3)_2NCH_2CH_2CH_2]_2N(CH_2CH(CH_3)OH)$, N-hydroxyalkylmorpholines, N-aminoalkylmorpholines, hydroxyalkylpyrrolizidines, aminoalkylpyrrolizidines, hydroxyalkylquinuclidines, aminoalkylquinuclidines, hydroxyalkyltriethylenediamines, aminoalkyltriethylenediamines, 3-quinuclidinol, and urea and amide derivatives of the tertiary amines described above.

Preferable cell opening additives are 2-cyano-N-[3-(dimethylamino) propyl]acetamide and $(NC)CH_2C(O)OCH_2CH_2N(CH_3)CH_2CH_2OCH_2CH_2N(CH_3)_2$.

The cell opening additive is preferably used at levels of 0.001 to 2.5 parts per hundred parts polyol (pphp), more preferably 0.005 to 1.5 pphp, and most preferably 0.01 to 0.5 pphp. The cell opener can be delivered as a neat liquid or dissolved in one of the components of the formulation such as the surfactant, water, crosslinker, polyol, amine catalyst, or catalyst.

The cell opening additives according to the invention are employed in the manufacture of polyether and polyester flexible polyurethane foams in the manner known to the art. In producing the polyurethane foams using these cell openers, one or more polyether or polyester polyols are employed for reaction with a polyisocyanate, especially a diisocyanate, to provide the urethane linkage. Such polyols have an average of typically 2.0 to 3.5 hydroxyl groups per molecule, hydroxyl numbers from 20 to 60, and weight average molecular weights from 2000 to 7000 daltons (atomic mass units). The density of a flexible polyurethane foam can be 0.6–25 lb/ft$^3$ (10–400 kg/m$^3$).

Illustrative of suitable polyols as a component of the polyurethane composition are the polyalkylene ether and polyester polyols. The polyalkylene ether polyols include the poly(alkylene oxide) polymers such as poly(ethylene oxide) and poly(propylene oxide) polymers and copolymers with terminal hydroxyl groups derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane and like low molecular weight polyols.

In the practice of this invention, a single high molecular weight polyether polyol may be used. Also, mixtures of high molecular weight polyether polyols such as mixtures of di- and trifunctional materials and/or different molecular weight or different chemical composition materials may be used.

Useful polyester polyols include those produced by reacting a dicarboxylic acid with an excess of a diol, for example, adipic acid with ethylene glycol or butanediol, or reacting a lactone with an excess of a diol such as caprolactone with propylene glycol.

In addition to the polyether and polyester polyols, the masterbatches, or premix compositions, frequently contain a polymer polyol. Polymer polyols are used in flexible polyurethane foam to increase the foam's resistance to deformation, i.e. to increase the load-bearing properties of the foam. Currently, two different types of polymer polyols are used to achieve load-bearing improvement. The first type, described as a graft polyol, consists of a triol in which vinyl monomers are graft copolymerized. Styrene and acrylonitrile are the usual monomers of choice. The second type, a polyurea modified polyol, is a polyol containing a polyurea dispersion formed by the reaction of a diamine and toluene diisocyanate (TDI). Since TDI is used in excess, some of the TDI may react with both the polyol and polyurea. This second type of polymer polyol has a variant called PIPA polyol which is formed by the in-situ polymerization of TDI and alkanolamine in the polyol. Depending on the load-bearing requirements, polymer polyols may comprise 20–80% of the polyol portion of the masterbatch.

The polyurethane products are prepared using any suitable organic polyisocyanate well known in the art including, for example, hexamethylene diisocyanate, phenylene diisocyanate, toluene diisocyanate (TDI), and 4,4'-diphenylmethane diisocyanate (MDI). Especially suitable are the 2,4-TDI and 2,6-TDI, individually, or together as their commercially available mixtures. Other suitable isocyanates are mixtures of diisocyanates known commercially as "crude MDI", also known as PAPI, which contain about 60% of MDI along with other isomeric and analogous higher polyisocyanates. Also suitable are "prepolymers" of these polyisocyanates comprising a partially prereacted mixture of a polyisocyanate and a polyether or polyester polyol.

Suitable urethane catalysts useful in making polyurethane flexible foams are all those well known to the worker skilled in the art and include tertiary amines like those used to catalyze the acid anhydride/alcohol reaction, such as triethylenediamine, N-methylimidazole, 1,2-dimethylimidazole, N-methyl morpholine, N-ethyl morpholine, triethylamine, tributylamine, triethanolamine, dimethylethanolamine and bis(dimethyl-aminoethyl) ether, and organotins such as stannous octoate, stannous acetate, stannous oleate, stannous laurate, dibutyltin dilaurate, and other such tin salts.

Other typical agents found in the flexible polyurethane foam formulations include chain extenders such as ethylene glycol and butanediol; crosslinkers such as diethanolamine, diisopropanolamine, triethanolamine and tripropanolamine; blowing agents such as water, liquid carbon dioxide, CFCs, HCFCs, HFCs, pentane, and the like, especially water or water and HCFC; and cell stabilizers such as silicones.

The flexible polyurethane foams that can be prepared using the present invention include slabstock foams having a density of 12–100 kg/m$^3$, such as polyether-based: conventional (12–60 kg/m$^3$), high resilience (18–80 kg/m$^3$), filled (40–100 kg/m$^3$), semi-rigid (22–35 kg/m$^3$); and polyester-based: technical grades (20–50 kg/m$^3$), laminating grades (20–35 kg/m$^3$) and semi-rigid (22–35 kg/m$^3$) as well as molded foams having a density of 22–300 kg/m$^3$, such as polyether-based: conventional hot-cure (22–50 kg/m$^3$), high resilience and cold-cure (28–55 kg/m$^3$), semi-rigid (40–150 kg/m$^3$), and polyester-based (50–150 kg/m$^3$), "repol" or rebonded (60–300 kg/m$^3$). Also possible are microcellular molded foams having a core density of 400–600 kg/m$^3$, a skin density of 600–800 kg/m$^3$ and an overall density of 500–700 kg/m$^3$.

A general polyurethane flexible molded foam formulation having a 0.6–25 lb/ft$^3$ (10–400 kg/m$^3$) density, e.g., automotive seating 1–3 lb/ft$^3$ (16–48 kg/m$^3$), containing a stabilizer/cell opener according to the invention would comprise the following components in parts by weight (pbw):

| Flexible Foam Formulation | pbw |
|---|---|
| Polyol | 20–100 |
| Polymer Polyol | 0–80 |
| Silicone Surfactant | 0.5–2.5 |
| Cell Opener | 0.05–3 |
| Blowing Agent (e.g., water) | 1–8 |
| Auxiliary Blowing Agent | 0–4.5 |
| Crosslinker | 0.5–2 |
| Catalyst Composition | 0.1–5 |
| Isocyanate Index* = 70–115 | |

*Isocyanate index = (mole isocyanate/mole active hydrogen) × 100

In the present invention the preferred blowing agent for making the flexible molded foams is water. Water is used at 1 to 8 parts per hundred polyol (pphp), especially 3 to 6 pphp, and can optionally be used with other blowing agents.

Other additives may of course be employed to impart specific properties to the flexible foams. Examples are flame retardants, colorants, fillers and hardness modifiers.

The polyurethane foams of this invention may be formed in accordance with any of the processing techniques known to the art, in particular, the "one shot" technique. In accordance with this method, foamed products are provided by carrying out the reaction of the polyisocyanate and polyol simultaneously with the foaming operation. It is sometimes convenient to add the stabilizer/cell opener to the reaction mixture as a pre-mixture with one or more of the blowing agent, polyol, water, and catalyst components.

The invention will be further clarified by a consideration of the following examples, which are intended to be purely exemplary of the invention.

EXAMPLE 1

PREPARATION OF 2-CYANO-N-[3-(DIMETHYLAMINO)PROPYL]ACETAMIDE

Ethyl cyanoacetate (51.106 g, 0.4518 mole) was added to 3-(dimethylamino) propylamine (46.162 g, 0.4518 mole) in a 250 ml round bottom flask equipped with a magnetic stir bar. After stirring for approximately 0.5 hr, 50 ml of toluene was added. The clear orange liquid was stirred at room temperature for approximately 15 hours, after which the ethanol and toluene were removed via vacuum distillation. 2-Cyano-N-[3-(dimethylamino)propyl]acetamide was obtained in 96% yield.

EXAMPLE 2

PREPARATION OF TDI FLEXIBLE MOLDED POLYURETHANE FOAM USING A CHEMICAL CELL OPENER OF THIS INVENTION

The formulation for preparing a TDI flexible molded foam is shown below (Table I):

TABLE I

| Component | Parts by Weight |
| --- | --- |
| Arcol E-648 Polyether Polyol[1] | 60.0 |
| Arcol E-519 Styrene-Acrylonitrile Polyol[1] | 40.0 |
| DABCO ® DEOA-LF (75% diethanolamine in water)[2] | 1.75 |
| DABCO ® DC-5169 Silicone Surfactant[2] | 0.60 |
| DABCO ® DC-5164 Silicone Surfactant[2] | 0.20 |
| Water (total) | 3.50 |
| DABCO ® 33 LV Amine Catalyst[2] | 0.21 |
| DABCO ® BL-11 Amine Catalyst[2] | 0.10 |
| 2-Cyano-N-[3-(dimethylamino)propyl]acetamide | 0.07 |
| Mondur TD-80[3], TDI Index = 105 | |

[1]From Arco Chemical
[2]From Air Products and Chemicals, Inc.
[3]From Bayer Corp. (80:20, 2,4-:2,6-toluene diisocyanate)

Resin premix was prepared by combining the polyols, DEOA-LF, surfactants, water, catalysts, and (in Example 2) a cell opening catalyst of this invention. This liquid was then mixed for 3–5 minutes using a Premier Mill mixer set between 2000–6000 rpm. The resin premix was stored in an incubator at 20° C. until needed. The desired amount of premix was weighed into a tared 32 oz. cup. Then the corresponding amount of TDI was added to this "B-side" blend and the resulting liquid mixed for 5 seconds at 5000 rpm using a Servodyne® lab mixer. The mixture was poured into a 12-inch×12-inch×3-inch mold which had been preheated to 155–165° F. and sprayed with a solvent-based release agent (PRC-798); the cup was held in an inverted position for 5 seconds, and the mold was immediately closed. The formulation was permitted to react in the mold for 5 minutes, after which the part was immediately demolded and weighed.

COMPARATIVE EXAMPLE 3

PREPARATION OF TDI FLEXIBLE MOLDED POLYURETHANE FOAM USING NO CHEMICAL CELL OPENER

TDI flexible molded polyurethane foams were prepared in this example using the formulation in Table II. The use level of DABCO® 33 LV Amine Catalyst had to be increased to 0.25 pphp polyol (rather than 0.21 pphp) in order to match the string gel time in Example 2.

TABLE II

| Component | Parts by Weight |
| --- | --- |
| Arcol E-648 Polyether Polyol[1] | 60.0 |
| Arcol E-519 Styrene-Acrylonitrile Polyol[1] | 40.0 |
| DABCO ® DEOA-LF (75% diethanolamine in water)[2] | 1.75 |
| DABCO ® DC-5169 Silicone Surfactant[2] | 0.60 |
| DABCO ® DC-5164 Silicone Surfactant[2] | 0.20 |
| Water (total) | 3.50 |
| DABCO ® 33 LV Amine Catalyst[2] | 0.25 |
| DABCO ® BL-11 Amine Catalyst[2] | 0.10 |
| Mondur TD-80[3], TDI Index = 105 | |

[1]From Arco Chemical
[2]From Air Products and Chemicals, Inc.
[3]From Bayer Corp.

EXAMPLE 4

CRUSH VALUES

The foams of Example 2 and Comparative Example 3 were placed on a force-to-crush apparatus immediately after demold; the first compression cycle was 60 seconds after demold. The force detection device was equipped with a 1000 pound capacity pressure transducer mounted between the 50 square inch circular plate and the drive shaft. The actual pressure appeared on a digital display. The pad was compressed to 50 percent of its original thickness and the force necessary to achieve the highest compression/cycle was recorded in whole pounds. Several compression cycles were completed. A cycle took approximately 30 seconds to complete. This device mimics the ASTM D-3574, Indentation Force Deflection Test, and provides a numerical value of freshly demolded foams' initial hardness or softness. Values are reported as the FTC value for the foam, based on the assumption that the lower the FTC values are the more open the foam is. This test required the foam to be acceptably cured at demold. The average values for three foams are reported in Table III.

TABLE III

| Foam Formulation | Average Pad Weight (g) | Average Initial Force-to-Crush Value (lbs) |
| --- | --- | --- |
| Example 2 | 265 | 15 |
| Comparative Example 3 | 265 | 100 |

The data in Table III show that extremely good dimensional stability of polyurethane foam is achieved using a chemical cell opener of this invention, compared to foams prepared with no chemical cell opener. Note that the foam of example 2, in which a cell opener of this invention was used, had a considerably better force-to-crush value than comparative example 3. The foam of example 2 would therefore have much better dimensional stability compared to the foam of comparative example 3.

What is claimed is:

1. A method for preparing a flexible polyurethane foam which comprises reacting a polyisocyanate with a polyol in the presence of a urethane catalyst, a blowing agent, optionally a silicone surfactant cell stabilizer, and an effective amount of a cell opening additive, wherein the cell opening additive comprises an active methylene or methine compound containing at least one tertiary amine represented by one of the formulae:

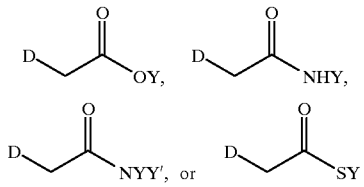

wherein Y and Y' are, independently, substituted C6–C10 aryl or CXX'X" wherein X, X', and X" are, independently, hydrogen, halogen, C1–C20 alkyl, C1–C20 alkylether, C1–C20 alkylamino, C6–C10 aryl, substituted C1–C20 alkyl, or substituted C6–C10 aryl, and at least one of the substituents on Y or Y' contains a tertiary amine group, and D is an electron-withdrawing substituent selected from the group consisting of CN, $NO_2$, Cl, Br, $CF_3$, I, CHO, and $C(O)NH_2$.

2. A method for preparing a flexible polyurethane foam which comprises reacting a polyisocyanate with a polyol in the presence of a urethane catalyst, a blowing agent, optionally a silicone surfactant cell stabilizer, and an effective amount of a cell opening additive, wherein the cell opening additive comprises an active methylene or methine compound containing at least one tertiary amine represented by one of the formulae:

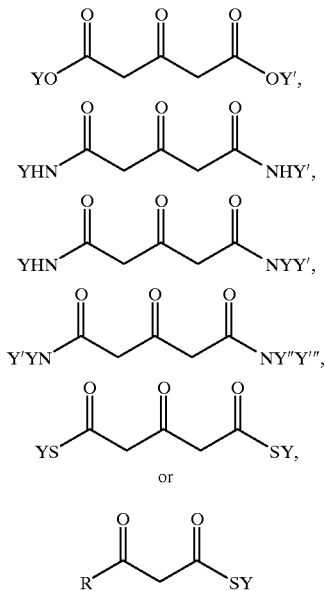

wherein Y, Y', Y", and Y'" are, independently, substituted C6–C10 aryl or CXX'X" wherein X, X', and X" are, independently, hydrogen, halogen, C1–C20 alkyl, C1–C20 alkylether, C1–C20 alkylamino, C6–C10 aryl, substituted C1–C20 alkyl, or substituted C6–C10 aryl, at least one of the substituents on Y, Y', Y", or Y'" contains a tertiary amine group, and R is C1–C20 alkyl, substituted C1–C20 alkyl, C6–C10 aryl, or substituted C6–C10 aryl.

3. A method for preparing a flexible polyurethane foam which comprises reacting a polyisocyanate with a polyol in the presence of a urethane catalyst, a blowing agent, optionally a silicone surfactant cell stabilizer, and an effective amount of a cell opening additive, wherein the cell opening additive comprises an active methylene or methine compound containing at least one tertiary amine represented by one of the formulae:

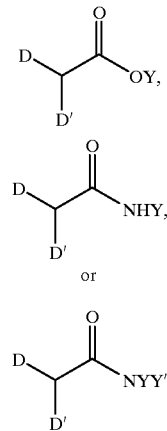

wherein Y and Y' are, independently, substituted C6–C10 aryl or CXX'X" wherein X, X', and X" are, independently, hydrogen, halogen, C1–C20 alkyl, C1–C20 alkylether, C1–C20 alkylamino, C6–C10 aryl, substituted C1–C20 alkyl, or substituted C6–C10 aryl, and at least one of the substituents on Y or Y' contains a tertiary amine group, D and D' are, independently, electron-withdrawing substituents selected from the group consisting of $NO_2$, CN, F, Cl, Br, $CF_3$, I, C(O)OR, C(O)R, CHO, and $C(O)NH_2$, and R is alkyl or aryl.

4. The method of claim 1 wherein one or both of Y and Y' derived from a compound are selected from the group consisting of:

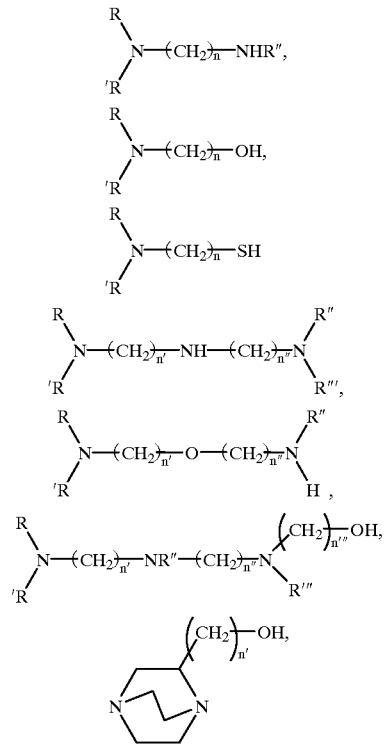

-continued

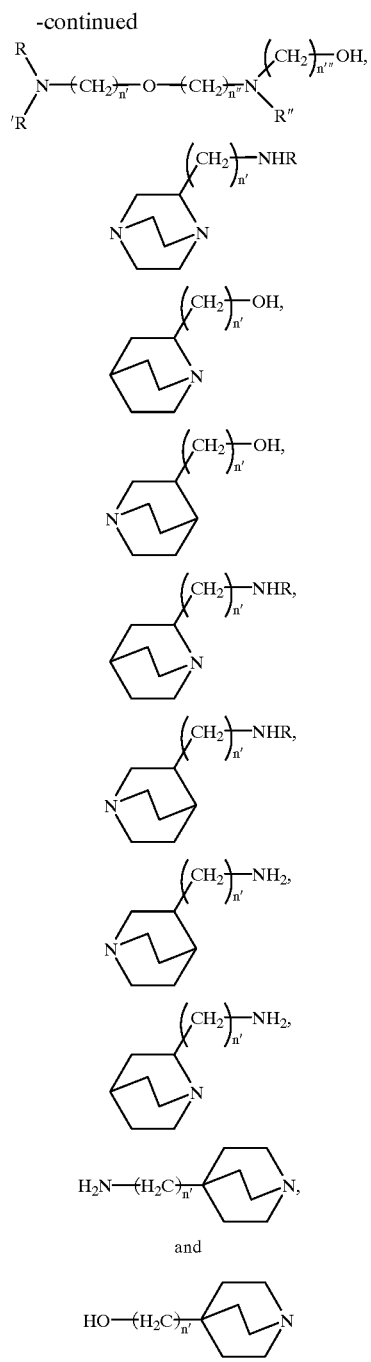

wherein R and R' are, independently, C1–C4 alkyl, n, n', n", and n'" are integers of 1 to 20, and R" and R'" are, independently, hydrogen, C1–C20 alkyl, C1–C20 alkylether, C1–C20 alkylamine, or C1–C20 alkylthioether.

5. The method of claim 1 wherein one or both of Y and Y' are derived from a member of the group consisting of 3-(dimethylamino)propylamine, 3-dimethylamino-1-propanol, dimethylaminoethanol, a trialkanolamine, a triaminoalkylamine, a 1-hydroxyalkylpyrrolidine, a 1-aminoalkylpyrrolidine, a 1-hydroxyalkylimidazole, a 1-aminoalkylimidazole, 2-ethanol, 2-1-methylethanol, tetramethyldiethylenetriamine, $(CH_3)_2NCH_2CH_2N(CH_3)CH_2CH_2OH$, $_2N(CH_2CH_2OH)$, $_2N(CH_2CH(CH_3)OH)$, an N-hydroxyalkylmorpholine, an N-aminoalkylmorpholine, a hydroxyalkylpyrrolizidine, an aminoalkylpyrrolizidine, a hydroxyalkylquinuclidine, an aminoalkylquinuclidine, a hydroxyalkyltriethylenediamine, an aminoalkyltriethylenediamine, and 3-quinuclidinol, wherein alkyl is C1 to C4.

6. The method of claim 3 wherein one or both of Y and Y' derived from a compound are selected from the group consisting of:

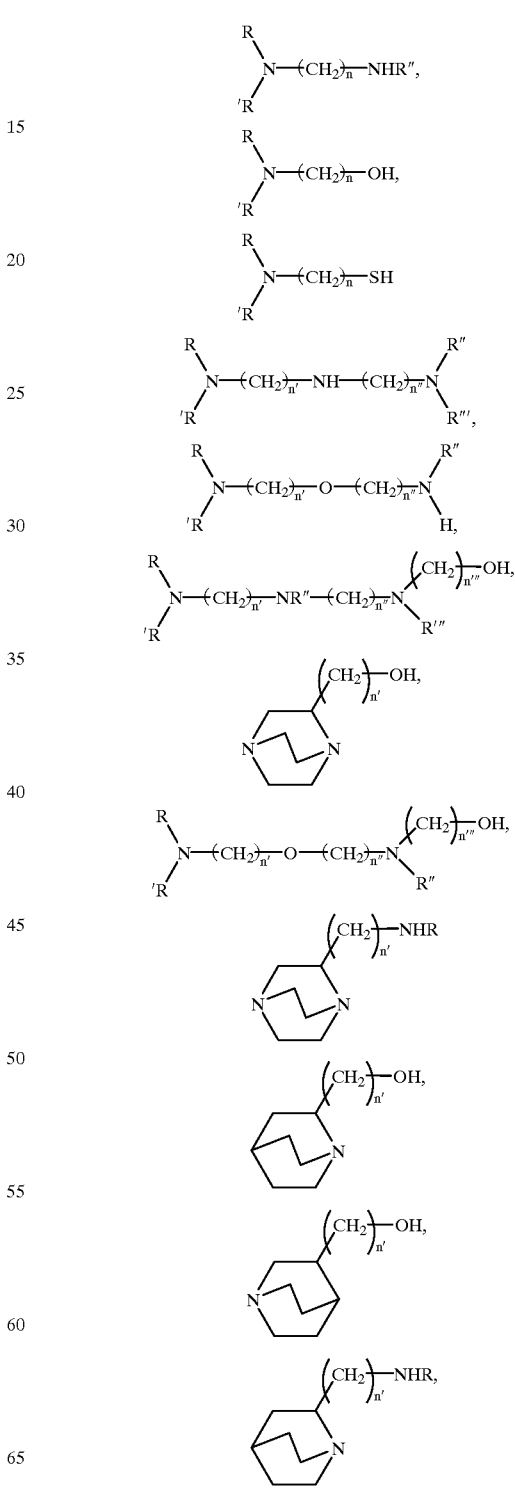

-continued

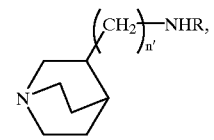

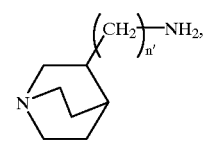

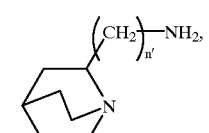

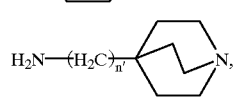

and

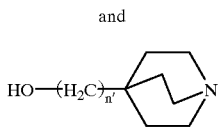

wherein R and R' are, independently, C1–C4 alkyl, n, n', n", and n'" are integers of 1 to 20, and R" and R'" are, independently, hydrogen, C1–C20 alkyl, C1–C20 alkylether, C1–C20 alkylamine, or C1–C20 alkylthioether.

7. The method of claim 3 wherein one or both of Y and Y' are derived from a member of the group consisting of 3-(dimethylamino)propylamine, 3-dimethylamino-1-propanol, dimethylaminoethanol, a trialkanolamine, a triaminoalkylamine, a 1-hydroxyalkylpyrrolidine, a 1-aminoalkylpyrrolidine, a 1-hydroxyalkylimidazole, a 1-aminoalkylimidazole, 2-ethanol, 2-1-methylethanol, tetramethyldiethylenetriamine, $(CH_3)_2NCH_2CH_2N(CH_3)CH_2CH_2OH$, $_2N(CH_2CH_2OH)$, $_2N(CH_2CH(CH_3)OH)$, an N-hydroxyalkylmorpholine, an N-aminoalkylmorpholine, a hydroxyalkylpyrrolizidine, an aminoalkylpyrrolizidine, a hydroxyalkylquinuclidine, an aminoalkylquinuclidine, a hydroxyalkyltriethylenediamine, an aminoalkyltriethylenediamine, and 3-quinuclidinol, wherein alkyl is C1 to C4.

8. The method of claim 4 wherein one or more of Y, Y', Y", and Y'" derived from a compound are selected from the group consisting of:

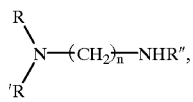

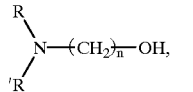

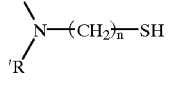

-continued

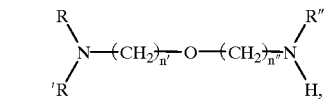

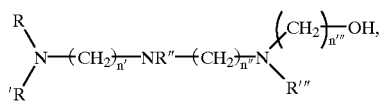

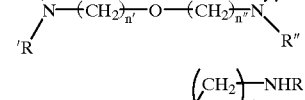

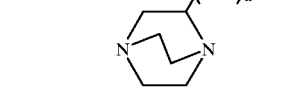

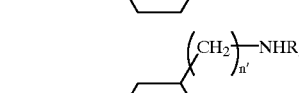

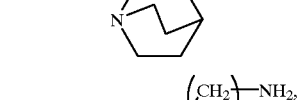

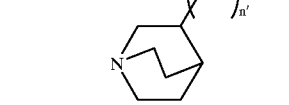

and

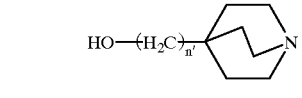

wherein R and R' are, independently, C1–C4 alkyl, n, n', n", and n'" are integers of 1 to 20, and R" and R'" are, independently, hydrogen, C1–C20 alkyl, C1–C20 alkylether, C1–C20 alkylamine, or C1–C20 alkylthioether.

9. The method of claim 2 wherein one or more of Y, Y', Y", and Y'" are derived from a member of the group consisting of 3-(dimethylamino)propylamine, 3-dimethylamino-1-propanol, dimethylaminoethanol, a trialkanolamine, a triaminoalkylamine, a 1-hydroxyalkylpyrrolidine, a 1-aminoalkylpyrrolidine, a 1-hydroxyalkylimidazole, a 1-aminoalkylimidazole, 2-ethanol, 2-1-methylethanol, tetramethyldiethylenetriamine, $(CH_3)_2NCH_2CH_2N(CH_3)CH_2CH_2OH$, $_2N(CH_2CH_2OH)$, $_2N(CH_2CH(CH_3)OH)$, an N-hydroxyalkylmorpholine, an N-aminoalkylmorpholine, a hydroxyalkylpyrrolizidine, an aminoalkylpyrrolizidine, a hydroxyalkylquinuclidine, an aminoalkylquinuclidine, a hydroxyalkyltriethylenediamine, an aminoalkyltriethylenediamine, and 3-quinuclidinol, wherein alkyl is C1 to C4.

10. The method of claim 1 wherein the cell opening additive is 2-cyano-N-acetamide.

11. The method of claim 1 wherein the cell opening additive is $(NC)CH_2C(O)OCH_2CH_2N(CH_3)CH_2CH_2OCH_2CH_2N(CH_3)_2$.

12. The method of claim 1 wherein D is CN.

13. The method of claim 3 wherein one or both of D and D' is CN.

* * * * *

UNITED STATES PATENT AND TRADEMARK OFFICE
CERTIFICATE OF CORRECTION

PATENT NO.   : 6,248,801 B1
DATED        : June 19, 2001
INVENTOR(S)  : Ingrid Kristine Meier It is certified that error appears in the above-identified patent and that said Letters Patent is hereby corrected as shown below:

Column 19,
Line 63, delete "2-ethanol, 2-1-methylethanol, tetramethyldiethylenetriamine, $(CH_3)_2NCH_2CH_2N(CH_3)CH_2CH_2OH$, $_2N(CH_2CH_2OH)$, $_2N(CH_2CH(CH_3)OH)$, " and substitute therefor -- 2-[N-(dimethylaminoethoxyethyl)-N-methyl-amino]ethanol, 2-[N-dimethylaminoethoxyethyl)-N-methylamino]-1-methylethanol, tetramethyldiethylenetriamine, $(CH_3)_2NCH_2CH_2N(CH_3)CH_2CH_2OH$, $[(CH_3)_2NCH_2CH_2CH_2]_2N(CH_2CH_2OH)$, $[(CH_3)_2NCH_2CH_2CH_2]_2N(CH_2CH(CH_3)OH)$ --

Column 21,
Line 38, delete "2-ethanol, 2-1-methylethanol, tetramethyldiethylenetriamine, $(CH_3)_2NCH_2CH_2N(CH_3)CH_2CH_2OH$, $_2N(CH_2CH_2OH)$, $_2N(CH_2CH(CH_3)OH)$, " and substitute therefor -- 2-[N-(dimethylaminoethoxyethyl)-N-methyl-amino]ethanol, 2-[N-dimethylaminoethoxyethyl)-N-methylamino]-1-methylethanol, tetramethyldiethylenetriamine, $(CH_3)_2NCH_2CH_2N(CH_3)CH_2CH_2OH$, $[(CH_3)_2NCH_2CH_2CH_2]_2N(CH_2CH_2OH)$, $[(CH_3)_2NCH_2CH_2CH_2]_2N(CH_2CH(CH_3)OH)$ --

Column 23,
Line 12, delete "2-ethanol, 2-1-methylethanol, tetramethyldiethylenetriamine, $(CH_3)_2NCH_2CH_2N(CH_3)CH_2CH_2OH$, $_2N(CH_2CH_2OH)$, $_2N(CH_2CH(CH_3)OH)$, " and substitute therefor -- 2-[N-(dimethylaminoethoxyethyl)-N-methyl-amino]ethanol, 2-[N-dimethylaminoethoxyethyl)-N-methylamino]-1-methylethanol, tetramethyldiethylenetriamine, $(CH_3)_2NCH_2CH_2N(CH_3)CH_2CH_2OH$, $[(CH_3)_2NCH_2CH_2CH_2]_2N(CH_2CH_2OH)$, $[(CH_3)_2NCH_2CH_2CH_2]_2N(CH_2CH(CH_3)OH)$ --

Signed and Sealed this

Sixth Day of August, 2002

*Attest:*

*Attesting Officer*

JAMES E. ROGAN
*Director of the United States Patent and Trademark Office*